UNITED STATES PATENT OFFICE.

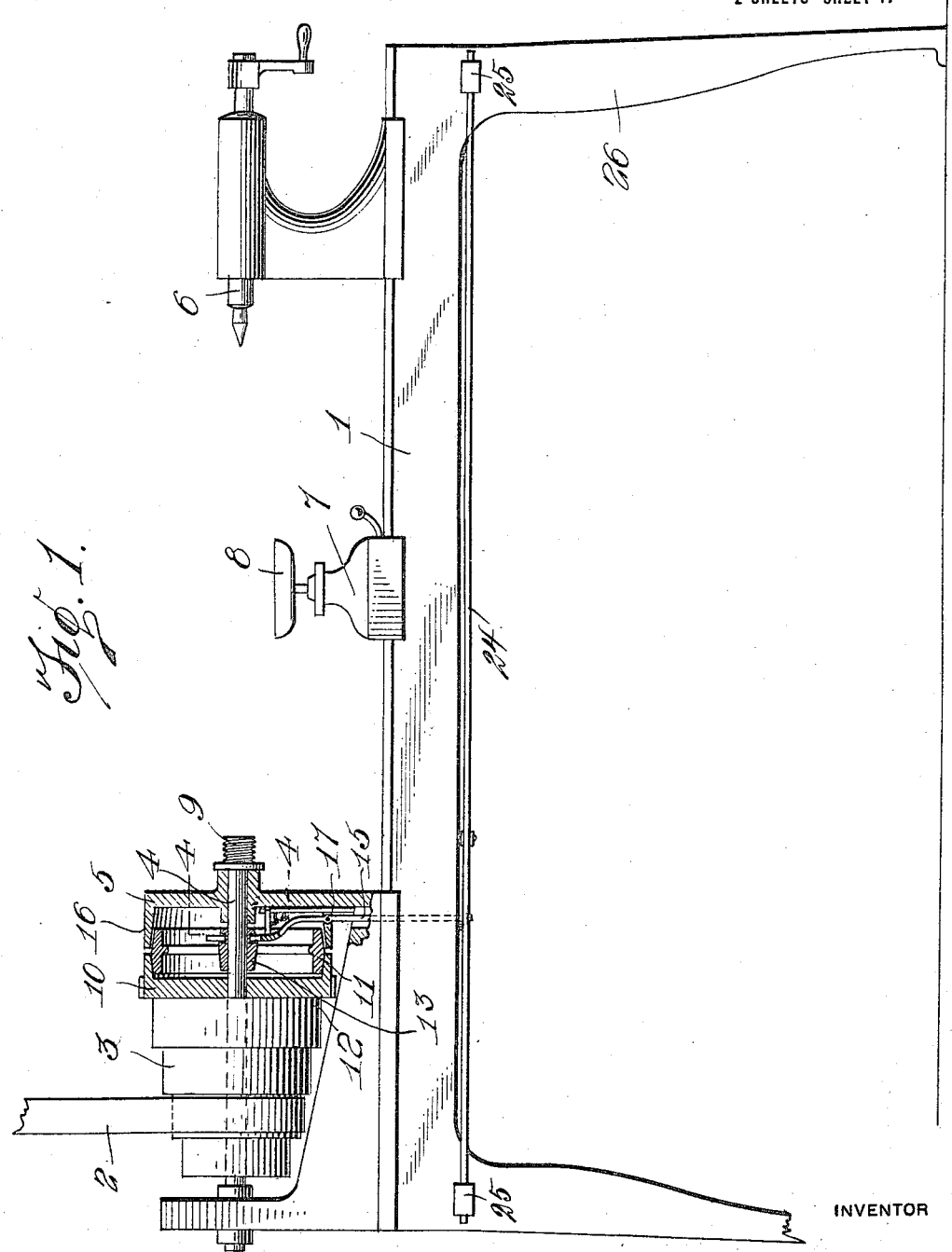

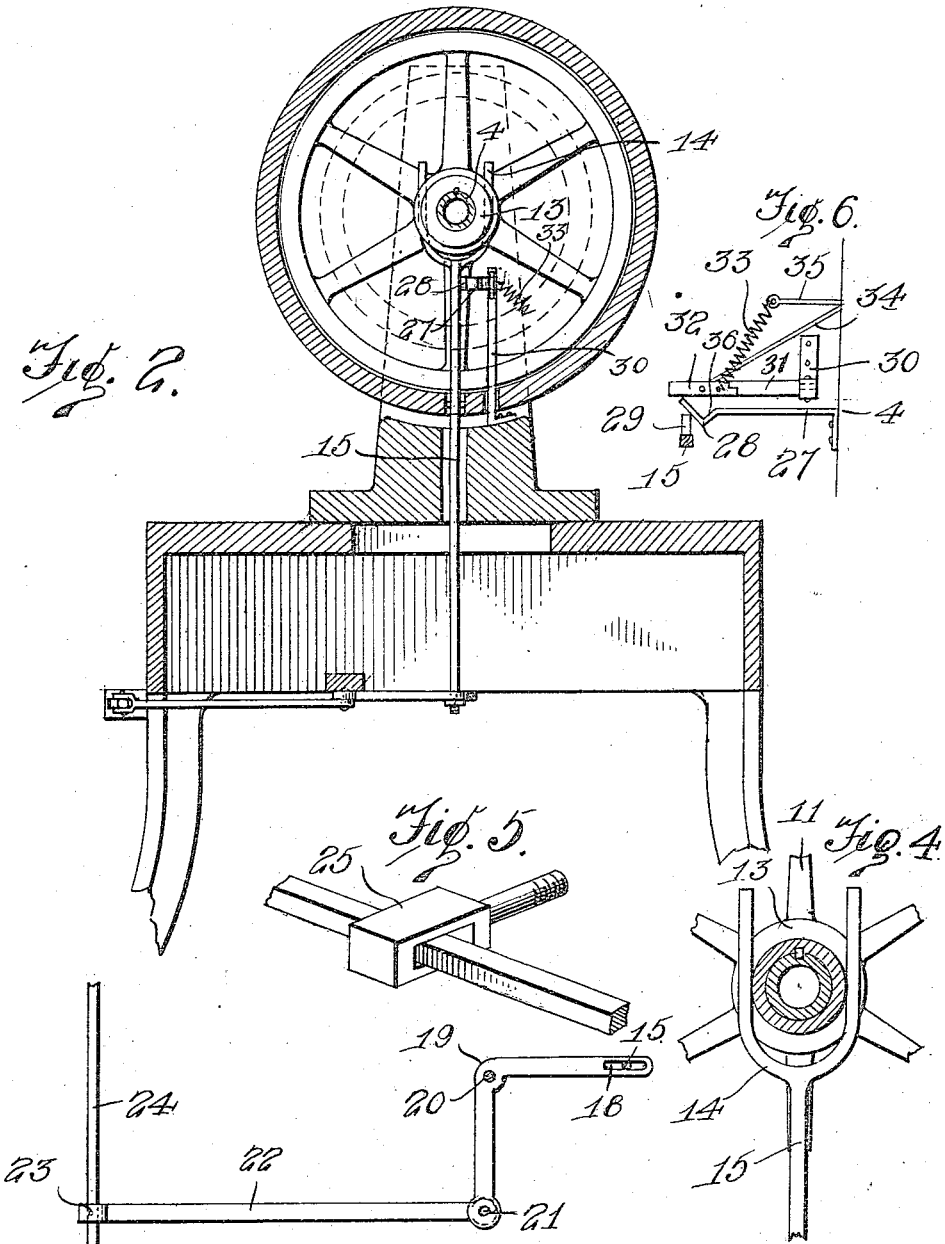

CLARK A. McCLUN, OF LEETONIA, OHIO.

STOP MECHANISM FOR LATHES.

1,259,116.   Specification of Letters Patent.   Patented Mar. 12, 1918.

Application filed March 7, 1916. Serial No. 82,736.

*To all whom it may concern:*

Be it known that CLARK A. McCLUN, a citizen of the United States, residing at Leetonia, in the county of Columbiana and State of Ohio, have invented certain new and useful Improvements in Stop Mechanism for Lathes, of which the following is a specification.

This invention has relation to certain new and useful improvements in stop mechanism for lathes, and has for its primary object the provision of a mechanism which will automatically stop a lathe should the operator be caught in the same.

Another object of the invention resides in the provision of improved and novel means adapted to be operated by pressure upon a rod in front of the lathe to withdraw the clutch from operative position.

The invention has for a further object the provision of improved and novel means for moving the clutch to inoperative position and locking the same against return to operative position.

With the above and other objects in view, the invention resides in the novel construction, combnaton, and arrangement of parts as hereinafter set forth in the specification, pointed out in the claims, and shown in the drawings, in which—

Figure 1 is an elevation of a lathe partly in section with my invention applied thereto;

Fig. 2 is a transverse section to show the stop mechanism;

Fig. 3 is a plan of a portion of the rest rod and mechanism connected with and operated by the same;

Fig. 4 is an enlarged detail section substantially on the plane of line 4—4 of Fig. 1;

Fig. 5 is an enlarged detail perspectice view, showing the mounting of the rest rod;

Fig. 6 is a detail plan of the clutch locking mechanism.

Referring more particularly to the drawings in which similar reference characters designate corresponding parts throughout the several views, 1 designates the frame, 2 the drive belt, 3 the cone pulleys, 4 the rotary shaft and 5 the head stock of a lathe of conventional form which also includes a tail stock 6 and a carriage 7 carrying the lathe tool. It will be understood that in this form of lathe, the work may be fastened upon the end 9 of the shaft 4 in the usual manner and the shaft 4 receives its power from the cone pulleys 3 by means of a clutch member 10 connected with said cone pulleys 3 and a sliding clutch wheel 11 keyed, as shown at 12, to the shaft 4 and in engagement with the clutch member 10 when in operative position to lock the clutch member 10 and pulleys 3 upon the shaft 4.

The head of the clutch wheel 11 is provided with a suitable annular groove 13, within which are engaged the opposite prongs of the bifurcated upper end 14 of the clutch lever 15. The main portion of the clutch lever 15 is offset from the upper bifurcated end 14 of the same and extends downwardly through the interiorly threaded beveled flange 16 of the head 5, said clutch lever 15 being pivoted upon the pivot pin 17 carried in the lower portion of the flange 16. The lower end of the clutch lever 15 extends through the elongated slot 18 in the free arm of the bell crank lever 19 which is pivoted centrally, as shown at 20, upon a suitable stationary support depending from the frame or table of the lathe. The remaining arm of the bell-crank lever 19 is pivoted, as shown at 21, to the operating rod 22, which is suitably mounted as shown at 23 upon the rest rod 24 which extends longitudinally in front of the frame 1 of the lathe. The rest rod 24 has its opposite ends loosely engaged in the heads of the supporting members 25 which are secured in the opposite legs 26 of the lathe frame 1, adjacent the upper ends of said legs 26.

It will be evident that should the operator be caught by the lathe, the body of the operator will be drawn over against the rest rod 24, forcing the same toward the frame 1, thereby swinging the bell-crank lever 19 which in turn will swing the clutch lever 15 upon the pivot pin 17 and move the pivoted clutch wheel 11 from engagement with the clutch member 10 and into engagement with the beveled inner face of the flange 16 of the stationary head 5, thereby automatically stopping the lathe.

In order that the clutch wheel 11 may be retained in this position, I have provided a locking means which consists of an arm 27 projecting from the head 4 which is provided with a substantially V-shaped member 28 at its outer end. The clutch lever 15 is provided with an outwardly extending lug 29 which is adapted to engage this V-shaped member 28 upon the movement of the clutch lever to stop the lathe. Extending from the head 4 is a bracket 30 which carries a rod 31 having a notch in its forward end.

Pivotally mounted upon the lower end of a supporting rod 34 is a latch 32 having a notch in one end thereof adapted for interlocking engagement with the notched end of the rod 31. These notched ends of the rod 31 and latch 32 are retained in interlocking engagement by a coil spring 33 which has one end secured to the notched end of this latch and its opposite end secured to a supporting rod 35.

Thus it will be seen that as the clutch lever shifts to disconnect the clutch 11 from the head 4, the lug 29 will engage the V-shaped member 28 and move the same which will in turn move the latch 32 against the tension of the spring 33 and in the recess 36. This will allow the clutch lever to pass. After the clutch lever has passed the V-shaped member 28 and latch 32, the latch will have assumed its normal position thus preventing the clutch lever shifting to connect the clutch 11 and head 4.

While the preferred embodiments of the invention have been shown and described, it will be understood that minor changes in the details of construction, and arrangement of parts may be resorted to within the scope of the appended claims without departing from the spirit of the invention or sacrificing any of the advantages of the same.

What is claimed is:

1. The combination with a drive shaft and a drive clutch for the same; of a clutch lever connected with said clutch, a rest rod, connections between said rest rod and said clutch, means for supporting said rest rod, said clutch lever being adapted to be operated to move said clutch to inoperative position upon application of pressure to said rest rod in one direction, said clutch lever having a lug formed thereon, an arm for engagement with said lug to automatically lock said clutch lever and clutch in inoperative position, means for automatically locking said arm in operative position, means for returning the last-mentioned means to normal position, and means for holding said last-mentioned means in normal position.

2. The combination with a drive shaft and a clutch mechanism mounted thereon, a clutch rod for operating the same, of a movable rest bar operatively connected with the clutch rod adapted to shift the clutch rod to disconnect the clutch mechanism when the rest bar is moved, a lug carried by the clutch rod, a pivoted spring held latch adapted to be moved by the lug upon the movement of the clutch rod in one direction, the latch being moved to its normal position after the clutch rod has passed the same thereby preventing the clutch rod moving in the opposite direction.

3. A safety stop mechanism for lathes comprising the combination with the supporting frame of a lathe and the clutch mechanism mounted thereon of a pivoted clutch lever operatively connected with the clutch mechanism for moving the clutch into and out of engagement, a rod extending across one side of said frame and supported for lateral movement with respect thereto, a second rod extending at right angles to said first rod, a pivotally supported bell crank lever having one arm secured to said last mentioned rod and its opposite arm fastened to the clutch lever.

4. In a safety stop mechanism for lathes the combination with the supporting frame of the lathe and the clutch mechanism mounted on said frame of a pivoted lever operatively connected with the clutch to move the same into and out of engagement, a rod extending across one side of the frame and supported for lateral movement in the direction of the same, a link connection between said rod and lever adapted to move the clutch lever to a clutch disengaging position upon movement of said rod in the direction of the frame, and locking means engageable with said clutch lever to automatically lock the clutch out of engagement.

5. The combination with a drive shaft and a clutch mechanism mounted thereon, a rod for operating the same, a lug carried by the rod, a latch adapted to be moved by the lug upon the movement of the rod in one direction, the latch being moved to its normal position after the rod is moved in the opposite direction.

6. In a device of the character described, a movable rod adapted to be operatively connected with a shiftable member for shifting the same, a lug carried thereby, a support, a resilient member having one end thereof bent at an angle, a pivoted latch mounted adjacent the resilient member having one end normally engaged with the angularly extending end of the resilient member, the latch being moved by the lock upon the movement of the rod in one direction and returned to its normal position after the rod has passed the same thereby preventing the rod moving in the opposite direction.

In testimony whereof I affix my signature in presence of two witnesses.

CLARK A. McCLUN.

Witnesses:
 W. W. JOHNSON,
 J. H. MITCHELTREE.

Copies of this patent may be obtained for five cents each, by addressing the "Commissioner of Patents, Washington, D. C."